United States Patent [19]

Johnson et al.

[11] Patent Number: 4,597,017
[45] Date of Patent: Jun. 24, 1986

[54] SCANNER SYSTEM FOR X-RAY PLATE READOUT

[75] Inventors: R. Barry Johnson; James E. Modisette, both of San Antonio, Tex.

[73] Assignee: Texas Medical Instruments, Inc., Schertz, Tex.

[21] Appl. No.: 514,260

[22] Filed: Jul. 15, 1983

[51] Int. Cl.$^4$ .............................................. H04N 1/40
[52] U.S. Cl. .................................... 358/294; 358/217; 358/111
[58] Field of Search .................. 250/484.1, 327.2, 318; 358/111, 213, 211, 294, 298, 217

[56] References Cited

U.S. PATENT DOCUMENTS

| 3,283,159 | 11/1966 | Robbins | 358/211 |
| 4,319,284 | 3/1982 | Kiess et al. | 358/213 |
| 4,389,670 | 6/1983 | Davidson et al. | 358/211 |

Primary Examiner—Edward L. Coles, Sr.
Attorney, Agent, or Firm—Dula, Shields & Egbert

[57] ABSTRACT

An X-ray plate readout device comprising a generally light-tight housing, a holder for the X-ray plate within the housing, a light source located within the housing, scanning electronics for creating a generally raster pattern of light to the X-ray plate, and a display. The light source may be either a one- or two-dimensional cathode ray tube or light-emitting diode arrangement. Imaging optics are interposed between the light source and the X-ray plate. A plano-cylindrical fiberoptics plate is arranged in close proximity to the photoconductive layer of the X-ray plate. An amplifier is electrically connected between the layers of the X-ray plate. A video monitor is electrically connected to the output of the amplifier.

21 Claims, 8 Drawing Figures

SCANNER SYSTEM FOR X-RAY PLATE READOUT

TECHNICAL FIELD

The present invention relates generally to apparatus and methods used to obtain image information from modulation of a uniform flux. More specifically, the present invention relates to methods and apparatus used to optically scan a latent image in a photoconductor sandwich structure.

BACKGROUND ART

The multilayered photon detector structure of the present invention is fully described in U.S. Pat. No. 4,268,750, issued to Ronald Cowart on May 19, 1981. U.S. Pat. No. 4,268,750 describes an X-ray film replacement comprising a sandwich detector structure; a method of converting the latent radiographic image stored by such a detector to an electric video signal; an apparatus capable of practicing the method; and a diagnostic X-ray system using the apparatus. The detector sandwich comprises a conductive backplate overlaid by a photoconductive layer; for example, a layer of amorphous selenium having high effective dark resistivity. This high effective dark resistivity is accomplished by forming a blocking layer between the photoconductor and the conductive backplate. The photoconductor is overlaid by an insulator which is covered by a transparent conductive film. A further and more complete explanation of the operation and arrangement of the multilayered detector structure and accompanying optics is contained within this patent.

The method of reading out the multilayered detector structure of U.S. Pat. No. 4,268,750 utilizes a rotating multi-sided mirror. The mirror is mounted on an axis operably attached to a scanning motor which rotates the multi-sided mirror on its axis so as to cause a laser/light source to scan horizontally across the surface of the multi-layered detector structure. Each time the scanner moves from the left to the right side of the detector structure, a stepping motor moves the mirror through a sufficient arc to deflect the beam vertically about the detector structure. This arrangement enables the laser/light source to raster scan the entire surface of the detector.

While this readout means effectively scans the surface of the detector and produces a high resolution image therefrom, there are a number of problems associated with this readout scheme. First, it is difficult to achieve the highly linear and repeatable movement of the mirrors due to the complexity imposed upon the electro-mechanical hardware. Secondly, through the arrangement of mirrors and the nature of the laser, light level stability is a problem which affects the ability to readout and the quality of the final image produced. Thirdly, the alignment of the scanner, with the laser/light source and its associated optics, to the detector is a difficult task. Fourthly, the cost of this type of readout scheme is, on a relative basis, expensive. Both the laser and the electro-mechanical hardware impose a significant cost impact to the overall X-ray readout system. Finally, this arrangement of lasers, mirrors, and electro-mechanical hardware is inherently bulky. The sheer volume of this arrangement inhibits the mobility and portability of this device.

It is an object of the present invention to provide a method and apparatus capable of light emission having a complete raster scan.

It is another object of the present invention to provide a method and apparatus generating a raster scan which is highly linear and easily repeatable.

It is another object of the present invention to provide a method and apparatus that provides a stable light source during the readout of a plate structure.

It is a further object of the present invention to provide a method and apparatus which minimizes the complexity and cost of the scanning hardware.

It is still another object of the present invention to provide a scanning apparatus and method which enhances the portability and minimizes the bulk of the scanning optics.

These and other objects and advantages of the present invention will become apparent from a reading of the attached Specification and appended Claims.

DISCLOSURE OF INVENTION

The present invention is an apparatus for reading out the latent image stored as variations in surface charge on a photoconductive layer in a multi-layered photon detector apparatus comprising a generally light-tight housing, a holder for receiving the multi-layered photon detector, a one-dimensional light source acting on the detector and positioned so as to direct a beam of light to said detector, a scanner for moving the beam of light in a raster pattern over the detector, a signal acquisition device operably connected to the detector, and a display responsive to the signal acquisition device. The one-dimensional light source has the scanning device included therein so as to cause a beam of light to move across the photon detector in a raster pattern. Imaging optics are interposed between the one-dimensional light source and the multi-layered photon detector. A single mirror optical scanner is similarly included within the housing so as to appropriately direct the beam about the detector. The one-dimensional light source may be either a cathode-ray tube or an array of light-emitting diodes. The arrangement of this device may also include a moving slit synchronized with the movement of the scanner and located adjacent the multilayered detector structure. The signal acquisition device is an amplifier connected electrically between the first conductive layer of the detector and the transparent conductive layer of the detector. The display is a video monitor electrically connected to the output of the amplifier and adapted to display an image formed by the electrical signal produced by the amplifier. Radiographic storage and processing systems are operatively connected to and responsive to the output of the amplifier.

The present invention also includes a method of reading out an X-ray plate comprising the steps of: placing the X-ray plates within a generally light-tight housing; activating a one-dimensional light source disposed within the housing so as to produce a beam of light; focusing that beam of light upon the photoconductive layer of the X-ray plate; scanning the X-ray plate by directing that beam of light about the photoconductive layer in a raster pattern such that a single pixel at a time is readout; measuring the variable discharge potential flowing in the photoconductive layer as it is scanned by the light; and transforming the measurements of this variable discharge potential into image information in a humanly perceivable form. This method may also include the step of moving a slit in a synchronized fashion corresponding to the scanning of the X-ray plate. This slit may be located at or near the photon detector, light source, or any other intermediate image of the source/detector.

Another embodiment of the present invention is an improved scanning apparatus for reading out the latent image on a photoconductive layer in a photon detector apparatus. This embodiment comprises: a two-dimensional light source in which only one point light source is illuminated at any one point in time; a scanner device acting on the two-dimensional light source fo producing a generally raster-like pattern of light upon the photoconductive layer; and imaging optics interposed between the two-dimensional light source and the photoconductive layer. The two-dimensional light source may be either a cathode ray tube, an array of light emitting diodes or a liquid crystal display. The imaging optics comprise a lens for directing the light from the two-dimensional light source to a point upon the photoconductive layer of the photon detector apparatus. The imaging optics may also include a fiberoptic sheet adjacent either the light source or the plate structure. A moving slit may also be included about the plate structure so as to direct the light to the plate structure.

BEST METHOD FOR CARRYING OUT THE INVENTION

Figure 1:
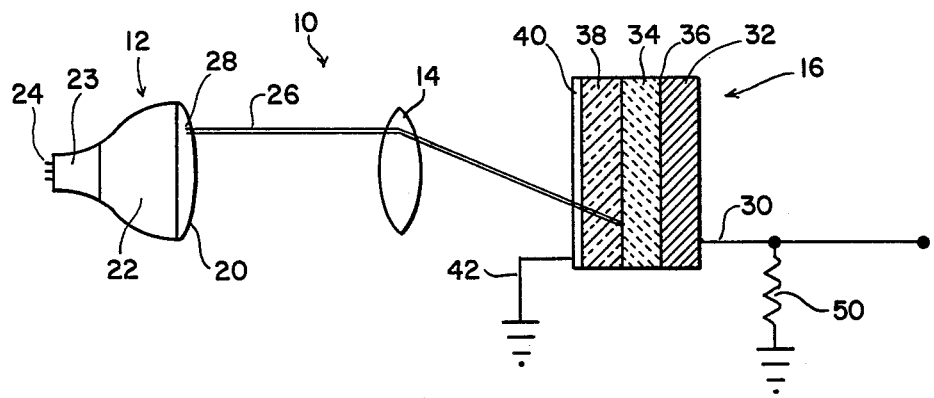
FIG. 1 is a simplified diagram showing the major components of the present invention, and in particular, showing the internal structure of a multilayered photon detector.

The apparatus for reading out latent images is shown generally at 10 in FIG. 1. This readout arrangement 10 comprises cathode ray tube 12, imaging lens 14, and multi-layered photon detector 16. These elements work in combination so as to extract an image from a photoconductive layer within detector 16.

Cathode ray tube 12 provides a means for generating a beam of light within the present system. Cathode ray tube 12 includes screen 20, housing 22, electron gun 23, and electrical connection 24. Cathode ray tube 12 comprises an evacuated glass container with a phosphorescent screen 20 at one end and a focused electron gun 23 and deflection system (not shown) at the other. Screen 20 is similar in appearance and shape to a television screen. When an electron beam emerges from the electron gun 23, it passes through pairs of metal plates mounted in such a way that they deflect the beam horizontally and vertically to produce a luminous pattern on screen 20. The screen image is a visual representation of the voltages applied to the deflection plates and electron gun. In the present invention, this cathode ray tube 12 is used to produce a beam of light 26 originating from luminescent spot 28 on screen 20. The internal workings of the cathode ray tube 12 operate to produce spot 28 on the screen. This technology is well known within the field of cathode ray tubes. The luminance of spot 28 can be maintained at either a constant value or a temporarily modulated (pulsed) mode, as needed. Electrical connections 24 are suitably arranged so as to connect to any power source, as needed.

Imaging lens 14 receives beam 26 from cathode ray tube 12. Lens 14 serves to image spot 28 as a single pixel onto multi-layered photon detector 16. Lens 14 is typically a flat-field lens.

Multi-layered photon detector 16 is the subject of considerable discussion within U.S. Pat. No. 4,268,750. In summary, multi-layered photon detector 16 has first electrode 30 conductively connected to a first conductive layer 32. Conductive layer 32 is a plate made of aluminum or any other suitable conductor. An oxide layer 36 is interposed between plate 32 and a photoconductive layer 34 so as to act as a blocking contact between those layers. Transparent insulating layer 38 overlays and may be integrally affixed to photoconductor layer 34. Transparent conductive layer 40 may be integrally affixed to and overlie insulator 38. These layers may be made by vapor deposition or by adhesively bonding the individual components together. Transparent conductive layer 40 is electrically connected to lead 42.

In the preferred embodiment of this invention, plate 32 is made of aluminum approximately one-tenth inch (1/10th") thick. The photoconductive layer 34 is a layer of amorphous selenium. This selenium is approximately 150 microns thick. The transparent insulator 38 is made of a Mylar material. Transparent conductive layer 40 may be made of Nesa glass, a thin film of metal deposited directly on the transparent insulator 38, or a plastic film with a conductive coating, i.e., gold-covered Mylar. The entire structure of multilayered photon detector 16 may be made by depositing successive layers of selenium, an insulator, and a thin film of metal into an aluminum plate. Assembly may be accomplished by vapor deposition, sputtering, or any other technique used to deposit even-thickness films. This technology is well developed in the art of semiconductor electronics, glass manufacturing, and optical thin-film coatings.

While the preferred embodiment of the present invention is recited in combination with the multi-layered detector structure of U.S. Pat. No. 4,268,750 (otherwise known as "the Anderson System"), it is believed that the present invention is applicable to a wide variety of photon detector structures. The description of this layered structure as the preferred embodiment is not intended as a limitation of the present invention.

As seen in FIG. 1, beam 26 is directed from screen 20 through imaging lens 14, through transparent conductive layer 40, through transparent insulating layer 38, and onto photoconductive layer 34. The interaction of each of these elements of the present invention is described hereinafter.

Figure 4:
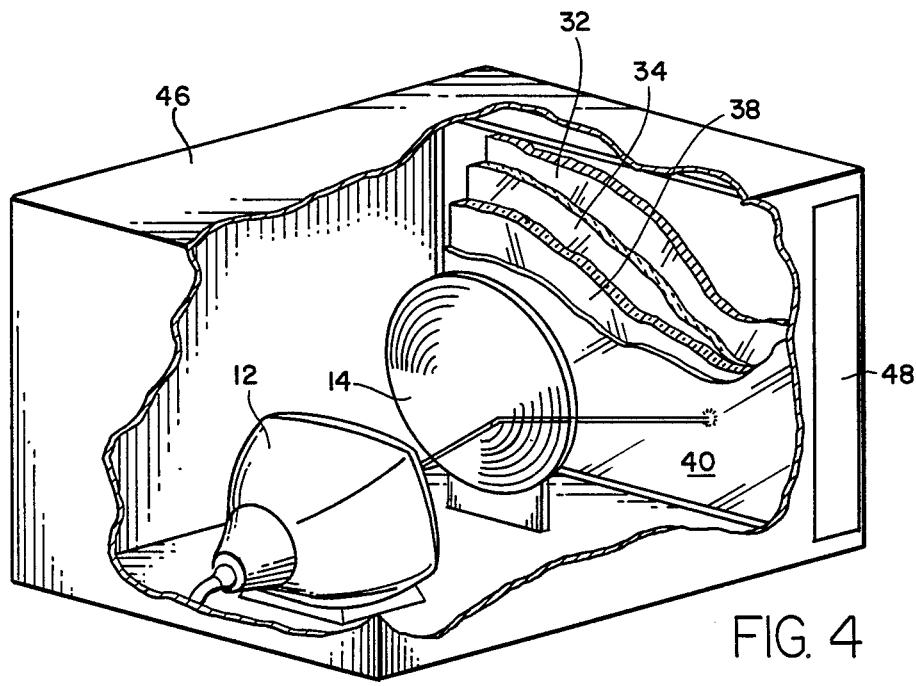
FIG. 4 shows a partially cut-away view of an apparatus adapted to practice the preferred embodiment of the present invention.

FIG. 4 shows a partially cut-away view of the preferred embodiment for reading out a latent image. As can be seen from this view, each of the components, as shown in FIG. 1, are contained within enclosure 46. Enclosure 46 is a generally light-tight housing. At one end of enclosure 46 is a holder 48. Holder 48 contains the milti-layered photon detector 16 and maintains the photon detector in its proper position within enclosure 46. Cathode ray tube 12 is positioned as needed at the other end of enclosure 46. Imaging lens 14 is shown as interposed between the photon detector 16 and cathode ray tube 12.

Figure 5:
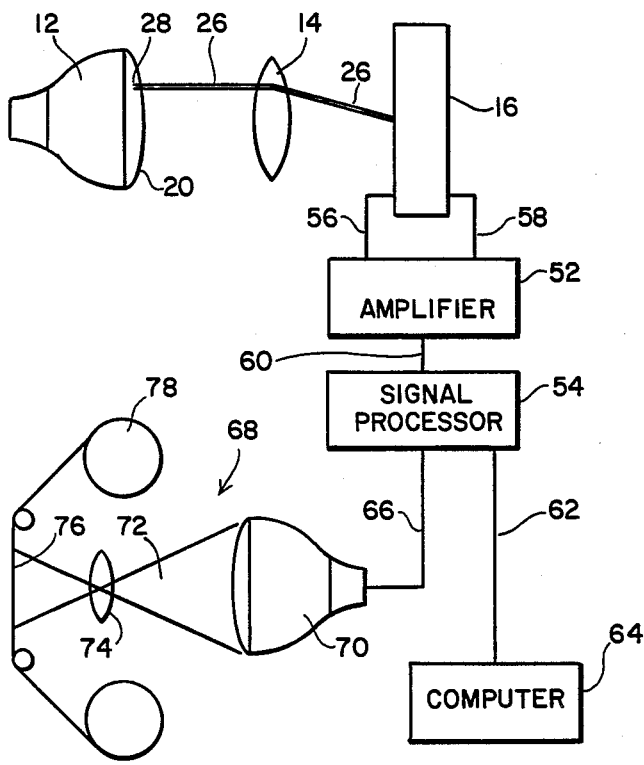
FIG. 5 is a schematic block diagram illustrating the cathode ray tube embodiment of the present invention constructed according to the preferred embodiment of the invention.

The operation of the preferred embodiment is shown schematically in FIG. 5. Initially, a two-dimensional cathode ray tube 12 generates beam of light 26, originating from spot 28 on screen 20. Beam 26 passes through imaging lens 14 so as to be directed toward multi-layered photon detector 16. Cathode ray tube 12 contains the necessary scanning technology to enable spot 28 to move about screen 20 in a generally two-dimensional, raster-like manner. Since the raster pattern is generated from within the cathode ray tube 12, there is no need for a mirror or any electromechanical equipment for establishing scanning movement of the mirror.

Figure 2:
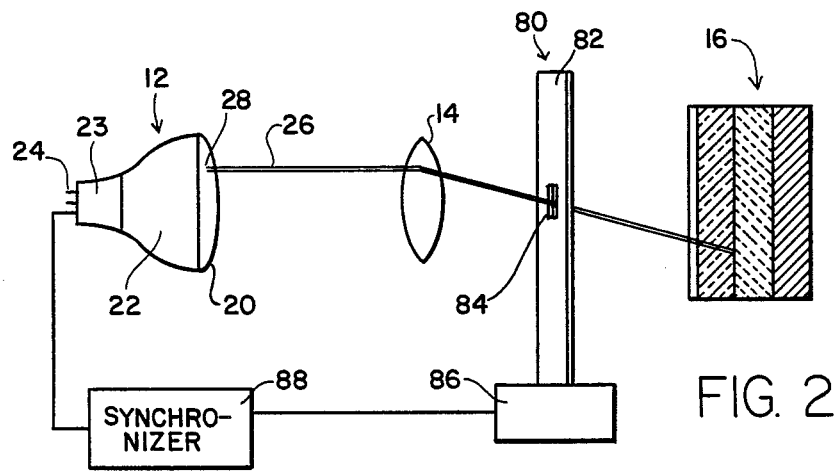
FIG. 2 is a schematical block diagram illustrating the cathode ray tube embodiment of the present invention in combination with a synchronized moving slit.

As will be later described in connection with an alternative embodiment of the present invention, a moving slit (as generally shown in FIG. 2) may be placed generally adjacent to detector 16. This slit is synchronized with the movement of the spot on the screen 20 of the cathode ray tube 12. As used in combination with the cathode ray tube, the slit serves to reduce the effects of any potential spot persistence upon the detector structure.

As scanning light beam 26 moves about detector 16, it produces a small moving spot on the surface of photoconductive layer 34. The size of this spot primarily determines the resolution of the final image. It is generally desirable that this spot size be kept small. On the other hand, however, sensitivity is improved (i.e., increased signal-to-noise ratio) by increasing the size of the spot. Under certain circumstances, it may be desirable to trade resolution for sensitivity.

As the beam 26 scans the surface of photoconductive layer 34, it generates electron-hole pairs. These electron-hole pairs are mobile within the photoconductive layer 34 and discharge a portion of the surface charge. The electrons then move toward the positively charged selenium surface of the photoconductive layer. The voltage drop produced across the resistor 50 connected between ground connection 42, which is attached to transparent conductor 40, and video output electrode 30, which is attached to aluminum conductive backplate 32, will be a function of the intensity of the surface charge at the point where the beam of light 26 generates the electron hole-pair.

Scanning beam 26 thus produces a modulated electrical signal at output electrode 30. The voltage of this output electric signal will be a function of the surface charge present at the spot where the beam 26 strikes photoconductive layer 34 of detector 16. The current present in the output circuit is a function of the frequency and intensity of the scanning beam and is a further function of the speed with which the light beam scans the surface of the photoconductor. Thus, the output current relates to the energy in the readout pulse. This process allows the very low intensity latent image on detector structure 16 to be electrically amplified by an amplifier 52, which may be a cooled amplifier, and signal processor 54. Amplifier 52 is a low-noise amplifier connected by lines 56 and 58 to detector structure 16. The electrical output of amplifier 52 is fed to signal processor 54 by line 60. The output of signal processor 54 is connected by line 62 to a digital computer 64. Computer 64 is used to digitally store and manipulate the information content imparted to it by the electrical signal produced by amplifier 52 by way of signal processor 54. The images may be stored on magnetic tape or disk file and can be manipulated within the computer by algorithms for image edge enhancement or pattern recognition for such tasks as automated diagnosis.

The output of signal processor 54 also goes by line 66 to mass storage system 68. Mass storage system 68 contains a high resolution display tube 70, which produces an analog image 72, which is focused by focusing optics 74 onto film plane 76 of a mass film storage system 78. This mass film storage system 78 may be a 35 or 70 millimeter casette system.

The principal advantage of using the preferred embodiment of the present invention is the fact that the spot on the face of a cathode ray tube can be electronically positioned and modulated so as to provide the light necessary to read out the photon detector 16. The cathode ray tube is used to directly establish the raster pattern of light impingement upon detector 16. No mirrors or locational electromechanical equipment is required. In addition, the cathode ray tube represents a matured area of technology in which spot position, linearity, spatial repeatability, and light output stability are effectively provided for.

FIG. 2 illustrates an alternative embodiment of the present invention showing a moving slit 80 in combination with two-dimensional cathode ray tube 12, imaging lens 14, and detector 16. The moving slit 80 is an important facet of the present invention. Slit 80 serves to minimize the scattered flux due to the flux passing between the cathode ray tube and the plate. Scattered flux can cause spatial distortions or errors in the reconstruction of the X-ray image. This scattering may be caused by dust or other particulate matter in the air or on the lenses between the cathode ray tube and the photon detector. Also, such scattering and resultant distortions can be caused by the persistence of the spot (or the spot's trail) on the screen of the cathode ray tube. Moving slit 80 comprises an opaque sheet 82 having an opening 84 occurring therein. Opaque sheet 82 is positioned in face-to-face relationship with and in close proximity to the transparent conductive layer 40 of the photon detector 16. Opening 84 is a slit which minimizes the effect of flux scattering from the cathode ray tube. Opaque sheet 82 is contained with control equipment 86. Control equipment 86 essentially is a means for moving the sheet from left to right and from top to bottom in accordance with the movement of the spot 28 on screen 20. This movement may be accomplished by suitable gearing or other means well known within the art. Also, other techniques for producing a moving slit may be used. This may include mounting a horizontal slit along the face of the detector structure. It may also include an arrangement of two sheets, one having horizontal slit and the other a vertical slit, in which the sheets are moved in relation to each other so as to produce a raster-like scanning pattern about the detector structure.

The control equipment 86 is connected to cathode ray tube 12 through synchronizer 88. Synchronizer 88 serves to coordinate the movement of the moving slit 80 with the movement of the spot 28. This involves processing the signal from the electron gun of the cathode ray tube into an appropriate signal for activating the control equipment. The slit should be as narrow as practicable, typically about a 3×3 pixel size. The use of this slit eliminates most of the effects of flux scattering from the cathode ray tube.

This arrangement, as illustrated in FIG. 2, may also be positioned within a soft vacuum. This vacuum would serve to minimize scattered flux resulting from dust or other particulate matter in the air. In such an arrangement, the slit 80 could be placed in close promixity to the cathode ray tube 12. This would effectively prevent scattering and the resultant distortions caused by spot persistence on the screen of the cathode ray tube.

Figure 3:
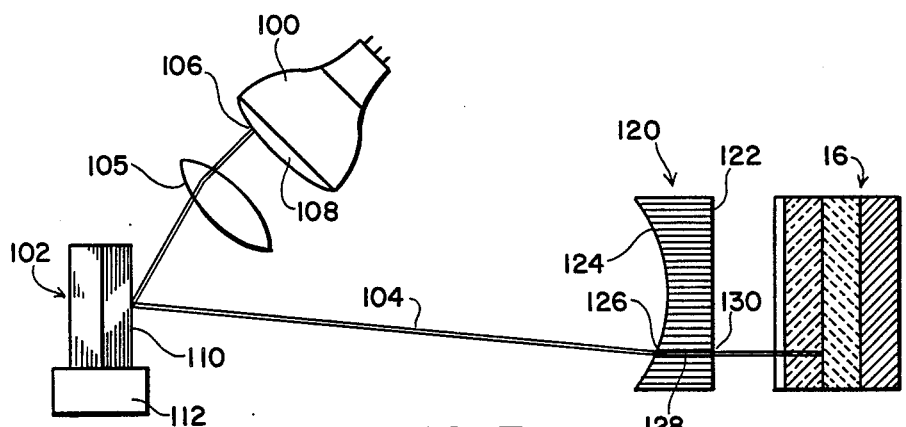
FIG. 3 is a simplified diagram showing the cathode ray tube of the present invention in combination with a scanning mirror and plano-cylindrical fiberoptics.

FIG. 3 illustrates an alternative embodiment of the present invention utilizing a one-dimensional cathode ray tube 100 in combination with a single mirror optical scanner 102 for producing the necessary raster. As with the two-dimensional cathode ray tubes, the one-dimensional cathode ray tube will produce a beam of light 104. This beam of light will appear as a spot 106 on the screen 108 of the cathode ray tube 100. It is important to realize, however, that the one-dimensional cathode ray tube will only produce and move the spot 106 along a single line. This is as opposed to the two-dimensional cathode ray tube which will move the spot generally throughout the length and width of the screen. Single-mirror optical scanner 102 has a reflective surface 110 generally receiving the beam of light 104 from cathode ray tube 100. Scanner 102 also contains rotation equipment 112 for producing rotational movement of reflective surface 100. Reflective surface 110 serves to direct the beam 104 toward detector 16 through an appropriate lens, or other optics.

In operation, the embodiment of FIG. 3 combines the movement of the single mirror optical scanner 102 with the movement of spot 106 across a screen 108 of the cathode ray tube. In other words, the raster pattern is provided in one direction by the movement of the spot across the single line cathode ray tube. The other direction of the scanning movement is provided by the rotation of scanner 102. The spot image is positioned on the detector 16 in the orthogonal direction to the flying spot by scanning mirror 102. Thus, the proper coordination and focusing of the cathode ray tube 100, the imaging lens 109, and the single mirror optical scanner 102 produces the necessary raster scanning pattern on the photoconductive layer of the photon detector 16.

FIG. 3 also shows another unique feature of the present invention, namely, the plano-cylindrical fiberoptic element 120. Fiberoptic element 120 is used in place of imaging lens 14 and moving slit 80 in this embodiment. Fiberoptic element 120 has a generally flat surface 122 adjacent to detector 16. The other side of the fiberoptic element 120 has a generally cylindrical radius section 124. Each of the fibers of this element 120 extend longitudinally from side 122 to section 124. The purpose of fiberoptics element 120 is to prevent defocus which degrades resolution and radiometric accuracy. Without the fiberoptic element 124, the scanning process can reasonably be expected to introduce an apparent cylindrical field curvature at the surface of detector 16. The degree of defocus is dependent upon the magnitude of the field curvature, the lens effective focal ratio, the other system requirements. The plano-cylindrical fiberoptics element 120 overcomes this field curvature problem by matching the cylindrical radius of section 124 to the field curvature of beam 104. At point 126 beam 104 is generally perpendicular to the surface of section 124. The fibers 128 carry and reshape the spot image 126. The spot image is emitted at point 130 on plano-surface 122. This beam 104 impinges the surface of detector 16 directly from point 130.

A moving slit 80 may also be used in combination with the plano-cylindrical fiberoptic element 120 of this embodiment in order to minimize the effects of flux scattering upon the fiberoptic element. While not illustrated, slit 84 can be placed in close proximity to an image plane (i.e., the cathode ray tube 100 or the detector plate 16). This would generally correspond to the requirements of the previously stated arrangement. In combination with the fiberoptics, this moving slit arrangement 80 minimizes flux scattering and prevents defocus of the spot image.

It should be noted that the plano-cylindrical fiberoptic element 120 may also be positioned at any point between the light source and the detector structure. While it is believed that the fiberoptics would be most effective adjacent the detector structure, this is not intended as a limitation on the invention. The fiberoptic element could be placed adjacent the screen of the cathode ray tube. The other side of the fiberoptics would direct light beams toward the scanning mirror. The light beam would then pass from the scanning mirror, through an imaging lens, and onto the detector structure, thereby preventing defocus and overcome certain field curvature problems.

The embodiments of the present invention using the cathode ray tube offer significant advantages over the use of lasers, mirrors and electromechanical motion-generating equipment. The detector structure and associated equipment are greatly reduced in complexity, volume, and expense. The cathode ray tube offers strong technological advantages in the area of spot position, linearity, spatial repeatability, and light output stability. The light emission of the cathode ray tube can be regulated so that it is consistent with the photoresponse of the multi-layered photon detector. While each of these advantages described herein is associated with the use of the cathode ray tube, it will become apparent hereinafter that many of the same advantages are available in the alternative embodiments using an array of light-emitting diodes (LED).

Figure 6A:
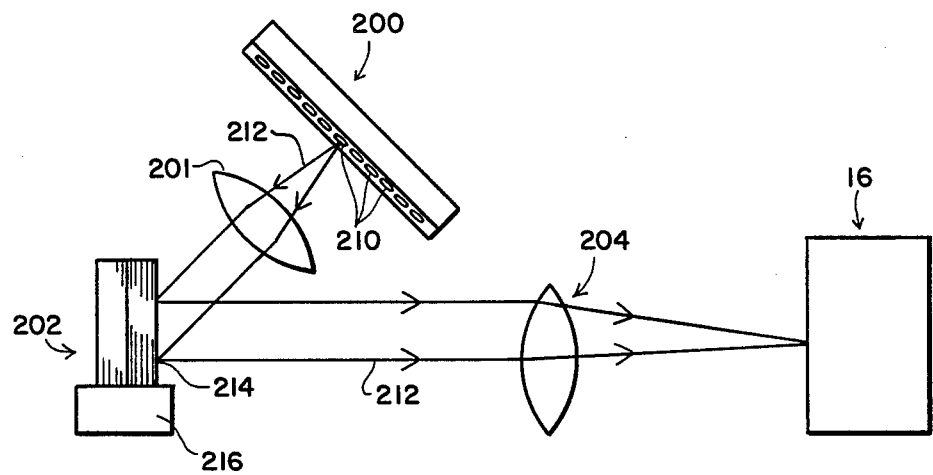
FIG. 6A is a simplified diagram showing an arrangement of a linear light-emitting diode embodiment of the present invention. In particular, this view shows the light-emitting diodes in combination with a collimator, a scanning mirror, and an imaging lens.

FIG. 6A illustrates the use of a linear LED array 200 in combination with a collimator 201, a scanning mirror 202, imaging lens 204, and multi-layered photon detector 16. LED array 200 is a single-line, or one-dimensional array of individual light-emitting diodes 210. LED array 200 is connected to appropriate electronics so as to produce the necessary linear scan pattern. These electronics, not shown, are well known within the art of LED drive electronics. Light-emitting diodes 210 are semiconductor devices that emit light when subjected to an applied voltage. These diodes can emit sufficient light so as to readout the image within photon detector 16.

In operation, a beam of light 212 is emitted from a single LED 210. Beam 212 passes through collimator 201, which collimates the light emitted by LED 210. After passing through collimator 201, the beam 212 is reflected off reflective surface 214 of scanning mirror 202. Scanning mirror 202 also includes rotational equipment 216 for providing the necessary movement of the mirror for the raster scanning pattern. Beam 212 passes from reflective surface 214 to flat-field lens 204. Flat-field lens 204 focuses the light onto photon detector 16.

The proper raster scanning pattern is created by selectively activating the LED's 210 within array 200. This activating of the LED's 210 produces a single line scan pattern. Rotation equipment 216 serves to properly move scanning mirror 202 so as to provide the other axial components of a raster scanning motion. The LED array image is positioned on the detector 16 in the orthogonal direction to the LED array by the scan mirror 202.

Figure 6B:
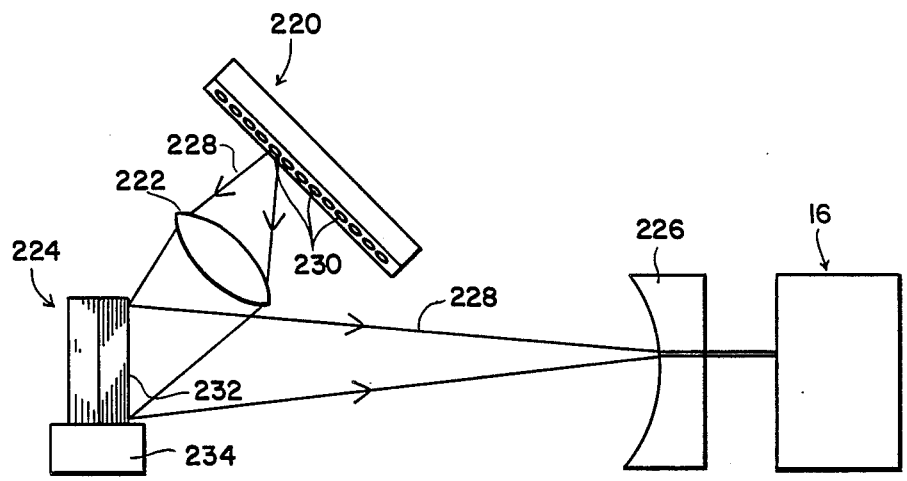
FIG. 6B is a diagram illustrating an arrangement of a linear light-emitting diode of the present invention. In particular, this view shows the light-emitting diodes in combination with an imaging lens, a scanning mirror, and a plano-cylindrical fiberoptics sheet.

FIG. 6B illustrates the use of a linear LED array 220 in combination with an imaging lens 222, a scanning mirror 224, a plano-cylindrical fiberoptic sheet 226, and a multi-layered photon detector 16. LED array 200 is a single-line, or one-dimensional array of individual light-emitting diodes as described within the previous embodiment. In operation, a beam of light 228 is emitted from a single LED 230. Beam 228 passes through imaging lens 222. Imaging lens 222 is a converging lens. Beam 228 passes through lens 222 toward the reflective surface 232 of scanning mirror 224. Scanning mirror 224 also includes rotational equipment 234 for providing the necessary movement of the mirror for the raster scanning pattern. Beam 228, a converging beam, passes from reflective surface 232 and is focused onto plano-cylindrical fiberoptic sheet 226. Beam of light 228 passes through fiberoptic sheet 226 toward photon detector 16.

Since the scanning system of FIG. 6B can reasonably be expected to produce an apparent cylindrical field curvature at the detector 16, the LED array image may suffer defocus, thereby degrading resolution and radiometric accuracy. To remedy this problem, a plano-cylindrical fiberoptic element 226 is positioned between the scanner 224 and the detector 16. The benefits and operation of this plano-cylindrical fiberoptic sheet 226 within this readout system have been described hereinbefore.

In the embodiments shown in FIGS. 6A and 6B, it should be noted that a moving slit similar to that illustrated at 80 in FIG. 2 may be incorporated into these embodiments so as to minimize the effects of flux scattering. Such a moving slit would preferably be positioned adjacent an image plane within this scanning system.

The proper raster scanning pattern is created by selectively activating the LED's 210 within array 200. This activating of the LED's 210 produces a single line scan pattern. Rotation equipment 216 serves to properly move scanning mirror 202 so as to provide the outer axial component of a raster scanning motion. The LED array image is positioned on the detector 16 in the orthogonal direction to the LED array by the scan mirror 202. The light output of LED 210 is temporarily constant.

In these embodiments, it should be noted that a moving slit similar to that illustrated at 80 in FIG. 2 may be incorporated into this embodiment so as to minimize the effects of flux scattering.

Figure 7:
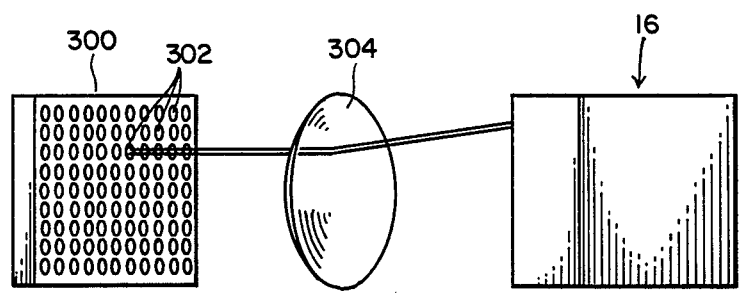
FIG. 7 is a perspective view of a two-dimensional array of light-emitting diodes, in combination with the multi-layer photon detector.

Another method of using light-emitting diode arrays is to utilize a two-dimensional array of LED elements as shown in FIG. 7. Array 300 includes a multiplicity of LED's 302 arranged so as to describe a complete two-dimensional raster scan of detector 16. This array 300 eliminates the need for an optical scanner, such as mirror 202 of FIGS. 6A and 6B, since it is directly imaged onto the plate by an imaging lens 304 or a fiberoptic element. LED's 302 are electronically arranged so that the lights are selectively activated throughout the entire pattern of the raster scan.

There are a number of advantages associated with the use of a two-dimensional array of LED elements. First, light-emitting diodes can be readily fabricated using current technology. Secondly, each of the LED's is electronically addressable so as to create any needed scan pattern. Thirdly, the inherent nature of light-emitting diodes provides extremely fast response time and nearly negligible persistence time. Fourthly, the LED array can provide a selection of spectral optical radiation output wavelengths (spectral output determined by the diodes selected) consistent with the photo response of the plate. Thus, using light-emitting diodes as the light source in a readout system of the photon detector apparatus offers considerable advantages over the use of lasers, multiple mirrors, and electromechanical motion-generating arrangements. Once LED's of sufficiently small size are readily available, they will offer significant advantages over the cathode ray tube method of reading out the detector structures.

As described hereinbefore, the present invention provides light-emitting diodes and cathode ray tubes as the light source for the readout of photon detectors. This is not meant to limit the present invention to those types of light sources. Under the scheme of the present invention, other light sources, such as liquid crystal displays (LCD's) may be used as an appropriate light source spatial modulator. Each of the aforedescribed embodiments offers features and advantages not found in the prior art.

The preferred embodiment and the alternative embodiments as illustrated and discussed in the Specifications are intended only to teach those skilled in the art the best way known to the inventor to make and use the invention. Nothing in the Specifications shold be considered as limiting the scope of the present invention. Many changes could be made by those skilled in the art to produce equivalent systems without departing from the invention. The present invention should only be limited by the following Claims and their legal equivalents.

We claim:

1. An apparatus for reading out the latent image stored as variations in surface charge on a photoconductive layer in a multilayered detector, said photoconductive layer being affixed between an insulating layer and a first conductive layer, said insulating layer affixed between said photoconductive layer and a second conductive layer, said apparatus comprising:

an at least one-dimensional light source means in which only one point is illuminated at any one time for producing light acting on said detector, said point being of variable size and intensity;

scanning means operatively interacting with said light source means for directing said light in a generally raster pattern upon said photoconductive layer;

signal acquisition means operatively connected to said detector for measuring the variable discharge current flowing in said photoconductive layer as said photoconductive layer is scanned by said light; and display means responsive to said signal acquisition means for displaying image information in a humanly perceivable form.

2. The apparatus of claim 1, said light source means being a cathode ray tube.

3. The apparatus of claim 2 or 1, said scanning means including a reflective optical scanner arranged so as to receive said beam of light from said cathode ray tube and to direct said beam of light toward said detector.

4. The apparatus of claim 1, 2, or 3 further including imaging optics for focusing said beam of light upon said detector.

5. The apparatus of claim 1, said light source means being a light-emitting diode array.

6. The apparatus of claim 1, 2 or 5 further comprising:
a generally light-tight housing; and
a holder within said housing, said holder capable of receiving said detector, said light source means arranged so as to transmit light to said detector within said housing.

7. The apparatus of claim 1, 2 or 5, said signal acquisition means being an amplifier connected electrically between said first conductive layer of said detector and said second conductive layer of said detector.

8. The apparatus of claim 7, said display means being a video monitor electrically connected to the output of said amplifier and adapted to display an image formed by the electrical signal produced by said amplifier.

9. The apparatus of claim 8, said display means further including a radiographic storage and processing system operatively attached and responsive to said amplifier's output.

10. An apparatus for reading out the latent image stored as variations in surface charge on a photoconductive layer in a detector comprising:
an at least one-dimensional light source means in which only one point is illuminated at any one time for producing light acting on said detector;
scanning means operatively interacting with said light source means for directing said light in a generally raster pattern over said photoconductive layer;
signal acquisition means operatively connected to said detector for measuring the variable discharge current flowing in said photoconductive layer as said photoconductive layer is scanned by said light;
display means responsive to said signal acquisition means for displaying image information in a humanly perceivable form; and
a fiberoptic arrangement disposed optically between said light source means and said detector so as to receive said beam of light from said light source means and to transmit said beam toward said photoconductive layer.

11. The apparatus of claim 10, said fiberoptic arrangement being of generally plano-cylindrical configuration, the planer side of said fiberoptic configuration being adjacent said detector, the generally cylindrical surface of said fiberoptic arrangement receiving said beam from said cathode ray tube, said beam being generally perpendicular to said generally cylindrical surface at the point of contact.

12. An apparatus for reading out the latent image stored as variations in surface charge on a photoconductive layer in a detector comprising:
an at least one one-dimensional light source means in which only one point is illuminated at any one time for producing light acting on said detector, said point being of variable intensity, said light source means further comprising a moving slit operatively synchronized with the movement of said light from said light source means, said moving slit disposed optically between said light source means and said photoconductive layer;
scanning means operatively interacting with said light source means for directing said light in a generally raster pattern over said photoconductive layer;
signal acquisition means operatively connected to said detector for measuring the variable discharge current flowing in said photoconductive layer as said photoconductive layer is scanned by said light; and
display means responsive to said signal acquisition means for displaying image information in a humanly perceivable form.

13. The apparatus of claim 12, said moving slit generally positioned adjacent said detector, said moving slit synchronized with the raster pattern of said light.

14. The apparatus of claim 12, said moving slit generally positioned adjacent said light source means, said moving slit synchronized with the raster pattern of said light.

15. A method of reading out a latent image from a photoconductive layer of a multilayered detector apparatus, said multilayered detector apparatus having said photoconductive layer affixed between an insulating layer and a first conductive layer, said insulating layer being affixed between said photoconductive layer and a second conductive layer, said method comprising the steps of:
placing said multilayered detector apparatus within a generally light-tight housing;
activating an at least one-dimensional light source in which only one point is illuminated at any one time, said light source positioned within said housing, said light source producing a beam of light of variable size and intensity from the illuminated point;
focusing said beam of light upon said photoconductive layer of said multilayered detector apparatus;
scanning said photoconductive layer by directing said beam about said photoconductive layer in a generally raster pattern;
measuring the variable discharge current flowing in said photoconductive layer as it is scanned by said beam; and
transforming the measurement of said variable discharge current flowing in said photoconductive layer into image information of humanly perceivable form.

16. The method of claim 15, said light source being a cathode ray tube.

17. The method of claim 16, further including the step of:
moving a slit in synchronized fashion with the scanning of said photoconductive layer, said slit being interposed between said light source and said photoconductive layer.

18. An improved scanning apparatus for reading out the latent image on a photoconductive layer in a photon detector apparatus, said improved scanning apparatus comprising:
a two-dimensional light source means in which only one point light source is illuminated at any one point in time, said point light source producing a beam of light acting on said detector apparatus, said two-dimensional light source means being a two-dimensional array of light-emitting diodes, said scanning means alternately illuminating each of said light-emitting diodes so as to create a raster-like pattern in said array;

scanning means acting on said two-dimensional light source means for creating a generally raster-like pattern of light upon said photoconductive layer; and imaging optic means interposed between said two-dimensional light source means and said photoconductive layer for focusing said beam of light upon said photoconductive layer.

19. An improved scanning apparatus for reading out the latent image on a photoconductive layer in a photon detector apparatus, said improved scanning apparatus comprising:

a two-dimensional light source means in which only one point light source is illuminated at any one point in time, said point light source producing a beam of light acting on said detector apparatus, said two-dimensional light source means being a liquid crystal display;

scanning means acting on said two-dimensional light source means for creating a generally raster-like pattern of light upon said photoconductive layer, said scanning means illuminating a portion of said liquid crystal display, said illuminating creating a raster-like pattern in said array; and imaging optic means interposed between said two-dimensional light source means and said photoconductive layer for focusing said beam of light upon said photoconductive layer.

20. The improved scanning apparatus of claims 18 or 19, said imaging optic means including a slit located adjacent said photon detector apparatus, said slit capable of movement about the detector apparatus in coordination with the raster-like pattern of said light, said slit opening to said light of said light source means.

21. The improved scanning apparatus of claim 19, said imaging optic means including a slit located adjacent said light source means, said slit capable of movement about said detector apparatus in coordination with the raster-like pattern of said light, said slit opening to said light of said light source means.

* * * * *